July 15, 1947.     C. J. BLOM     2,423,825
MOTORPUMP UNIT
Filed July 6, 1945
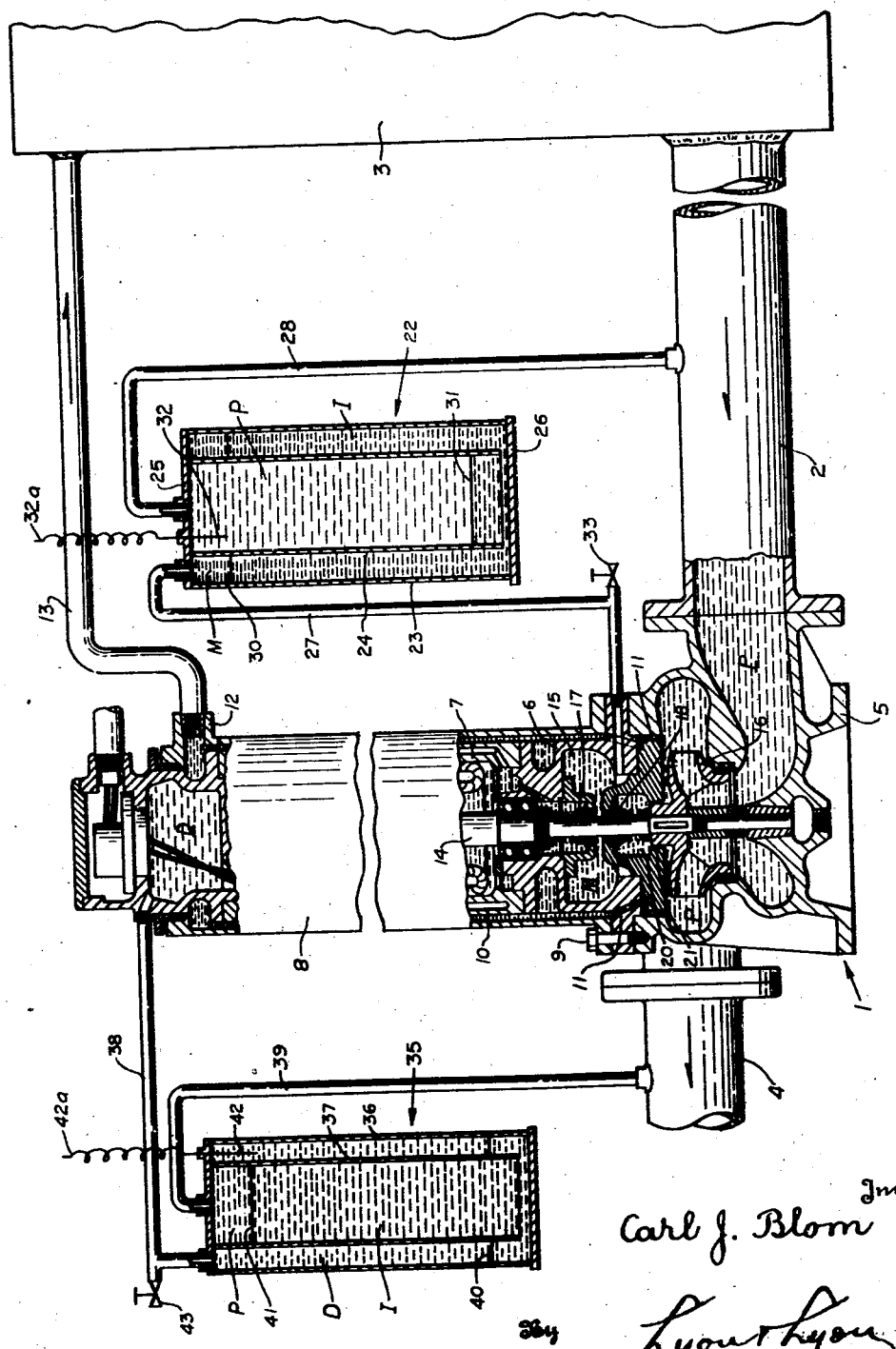
Inventor
Carl J. Blom
By Lyon & Lyon
Attorneys Patented July 15, 1947

2,423,825

UNITED STATES PATENT OFFICE 2,423,825

MOTOR PUMP UNIT

Carl J. Blom, San Marino, Calif., assignor to Byron Jackson Co., Vernon, Calif., a corporation of Delaware Application July 6, 1945, Serial No. 603,413

5 Claims. (Cl. 103—87)

1

This invention relates to motorpump units, and particularly to motorpump units of the type wherein the electric motor for driving the pump is encased in a fluidtight housing which is filled with a protecting liquid to exclude both the liquid being pumped and the surrounding medium from access to the motor compartment.

In my copending application Serial No. 577,696, filed February 13, 1945, there is disclosed a unit of the foregoing type wherein the protecting liquid in the motor compartment is subjected to the discharge pressure of a single stage pump, or to the pressure of an intermediate stage of a multistage pump, whereas the external or pump side of the motor shaft seal is subjected to the suction pressure of the pump. In this manner a pressure differential is established across the shaft seal, to assure that any leakage of fluid through the shaft seal will be outward leakage of protecting liquid from the motor compartment rather than inward leakage of pump liquid. The liquid being pumped may in some instances be miscible with the protecting liquid, and for that reason the pressure of the pump liquid is impressed on the protecting liquid through the intermediacy of a third liquid, a flexible bellows or other equivalent means capable of transmitting pressure between the pump liquid and the protecting liquid while at the same time isolating these liquids from each other. Motorpump units of the foregoing type have wide application in services which require pumping of liquids which are either highly volatile, explosive or corrosive, or have other characteristics which create a hazardous condition if leakage to the atmosphere takes place.

In some instances the character of the pump liquid or the nature of the process involved is such that no contamination whatsoever of the pump liquid by even a small amount of protecting liquid by leakage through the shaft seal, is permitted. The pumping of aviation gasoline is a typical example. In that case, the motorpump unit described in the aforementioned copending application might not be entirely suitable because a small amount of protecting liquid leaks through the shaft seal and mixes with the pump liquid.

It is a principal object of this invention to provide a motorpump unit which has all the advantages of the unit described in my copending application, and, in addition thereto, embodies the further advantage of protecting the pump liquid from contamination by the protecting liquid in the motor compartment.

A further object of this invention is to provide

2 a motorpump unit of the foregoing type, wherein the pump chamber and the motor compartment are isolated from each other by a third chamber which is separated from both chambers by shaft seals and is maintained at a lower pressure than either the pump chamber or the motor compartment, whereby leakage through the shaft seals occurs only in the direction of the third chamber.

A still further object of this invention is to provide an arrangement whereby the mixture of pump liquid and protecting liquid which leak into the third chamber may accumulate over a long period of time without affecting the operation of the unit, and may be drained off periodically while the unit is in operation.

Other objects and advantages of the present invention will be apparent from the following description of one embodiment thereof, reference being had to the accompanying drawing depicting a complete motorpump unit partly in vertical section and partly in elevation.

Referring to the drawing, a pump unit 1, herein shown as a single stage pump, is connected between a suction conduit 2 leading from any suitable source, such as a suction tank 3, and a discharge conduit 4. The pump case 5 supports a seal chamber housing 6, which in turn supports at its upper end an electric motor 7. The motor and the seal chamber housing are fully enclosed within an outer shell 8 which is bolted, as at 9, or otherwise secured in fluid-tight relation to the pump case 5. Thus the motor and pump constitute a fully enclosed unit with all moving parts enclosed and isolated from the surrounding atmosphere.

The shell 8 is preferably spaced from the motor housing to provide an annular cooling passage 10, which in this instance communicates at its lower end with the interior of the pump case through ports 11, and has an outlet 12 at its upper end connected by a conduit 13 to the suction tank 3. Thus a small quantity of the pump liquid is by-passed in heat-transfer relation to the motor for cooling the latter. It will be understood that, if preferred, cooling liquid from a separate source may be introduced into the cooling passage 10, as in Figs. 1 and 3 of my copending application Serial No. 577,696.

The rotor shaft 14 of the motor extends downwardly through the seal chamber 15 and into the pump casing, and has a pump impeller 16 keyed thereto. The juncture of the shaft with the upper and lower walls of the seal chamber is sealed by shafts seals 17 and 18 of the type generally referred to as "mechanical seals." The mechanical seals per se are conventional. Each seal includes a fixed seal element in the form of a bushing surrounding the shaft and secured in the wall of the seal chamber and a rotating seal element mounted on the shaft. The rotating and fixed seal elements have confronting sealing surfaces which are held in sealing contact by springs mounted on the shaft and bearing against the rotating seal elements.

A preferred form of this type of the seal is, described in detail and illustrated in Fig. 4 of my copending application Serial No. 547,617, filed August 1, 1944, which issued on July 30, 1946, as Patent No. 2,404,783, has proved to be highly satisfactory in all respects for this service. It should be noted, however, that whereas in my copending application Serial No. 547,617, and in Fig. 2 of my copending application Serial No. 577,696, the two seals are arranged in back-to-back relation in the seal chamber and both open inwardly toward the seal chamber, in the present instance the seals are each inverted so that a preponderance of pressure in the motor compartment and in the pump casing, over that in the seal chamber, serves to press the seal plates of each seal into tighter engagement. The reason for this reversed arrangement of the seals will be explained hereinafter.

The motor compartment is filled with a dielectric liquid D and the seal chamber 15 is also initially filled with dielectric liquid. As previously stated, it is essential in certain pumping services, such as that of pumping aviation gasoline, that the pump liquid be protected against contamination by the dielectric liquid. This is effected in the present instance by maintaining a slightly higher pressure on the pump chamber side of the seal 18 than on the seal chamber side thereof. It will be observed that the seal 18 is mounted in a chamber 20 which is in communication through throttle passage 21, with the pump chamber at the discharge side of the impeller 16. Hence the pressure in the chamber 20 is substantially equal to the discharge pressure of the pump.

The seal chamber, on the other hand, is maintained under pressure substantially equal to the suction pressure of the pump, in the following manner: A low pressure balance chamber 22 is mounted adjacent the motorpump unit and comprises spaced outer and inner walls 23 and 24, the inner wall being sealed to the upper end wall 25 and being spaced from the lower end wall 26 to form an inverted U-tube. The annular space between the walls 23 and 24 communicates at its upper end with the seal chamber 15 through a conduit 27, and the inner chamber within the inner wall 24 communicates at its upper end with the pump suction conduit 2 through a conduit 28. A body of intermediate liquid I separates the pump liquid P in the inner chamber from the liquid M in the upper portion of the outer annular chamber. This intermediate liquid I may be water or any other suitable liquid which is heavier than and immiscible with the liquids M and P.

It is thus apparent that the liquid M in the seal chamber 15 is subjected to substantially the suction pressure of the pump. Any leakage through the seal will therefore be leakage of pump liquid from the chamber 20 into the seal chamber 15. With the type of seal employed, this leakage is very small, on the order of possibly a pint over a period of several months' operation of the unit. It will be apparent that this leakage displaces an equal amount of the mixture M of dielectric liquid and pump liquid from the seal chamber 15 into the annular space between the walls of the balance chamber 22, displacing the interface 30 between the intermediate liquid I and the mixed liquid M downwardly and thus displacing the interface 31 between the intermediate liquid I and the pump liquid P upwardly and forcing an equal amount of pump liquid back into the suction conduit 2.

The capacity of the balance chamber 22 may be made sufficient to accommodate the leakage which takes place through the seals over a long period of time. Any suitable means may be provided for indicating when the interfaces 30 and 31 approach close to the opposite ends of the chamber. For example, if the pump liquid has good dielectric properties and the intermediate liquid is a conducting liquid, an electrode 32 may be mounted in the upper end wall 25 within the inner compartment and connected by a conduit 32a to a circuit including a bell or other alarm or indicator (not shown), the circuit being closed when the intermediate liquid contacts the electrode. The interfaces 30 and 31 may then be restored to their initial positions as indicated in the drawing by draining off the mixed liquid M through a drain valve 33 in the conduit 27.

In order to protect the motor 7 and to avoid contamination of the dielectric liquid D in the motor compartment by the pump liquid, the motor compartment is subjected to the pump discharge pressure, thus limiting the leakage through the upper shaft seal 17 to leakage of dielectric liquid into the seal chamber 15, it being recalled that the seal chamber is subjected to pump suction pressure. For this purpose a high pressure balance chamber 35 is provided, similar in all essential respects to the low pressure balance chamber 22. In this case, however, the upper end of the annular outer compartment between the walls 36 and 37 communicates with the motor compartment through a conduit 38, and the upper end of the inner compartment communicates with the pump discharge conduit 4 through a conduit 39. This balance chamber serves as a storage reservoir for dielectric liquid to replace that which leaks outwardly through the shaft seal 17, and therefore the interfaces 40 and 41 between the intermediate liquid I and the dielectric liquid D and pump liquid P, respectively, are initially as shown in the drawing. As dielectric liquid is transferred from the balance chamber to the motor compartment, the interface 40 rises and the interface 41 lowers. An electrode 42 may be mounted at the upper end of the outer annular compartment and connected through an electrical conductor 42a to a suitable alarm or indicator to give a warning signal when the interface 40 reaches the electrode. Additional dielectric liquid may then be injected, under pressure if the pump is in operation, through the valve 43 to restore the interfaces 40 and 41 to their initial positions.

It is thus apparent that the balance chambers not only serve to maintain the desired pressure differential across the seals 17 and 18, but the chamber 22 also serves as a reservoir for temporary storage of the liquid leaking past the seals and the chamber 35 serves as a reservoir for a reserve supply of dielectric liquid for the motor compartment. In addition to these functions, the balance chambers also permit the dielectric liquid in the motor housing and the liquid in the seal chamber to expand due to an increase in temperature in these compartments during operation of the unit.

In lieu of providing balance chambers 22 and 35 of the inverted U-tube type, with a body of intermediate liquid I in each chamber to isolate the pump liquid from the dielectric liquid, it is within the purview of this invention to employ balance chambers of other types, such, for example, as that shown in Fig. 3 of my copending application Serial No. 577,696, wherein each balance chamber contains a bellows or flexible diaphragm dividing the chamber into two separate compartments in pressure transfer relation with each other.

It will be evident from the foregoing description that a motorpump unit has been provided which is particularly well adapted to handle volatile hydrocarbons and other liquids the escape of which to the atmosphere even small amounts of would create a hazardous condition. It will further be evident that a motorpump unit embodying the features of this invention finds particular utility in pumping aviation gasoline and other liquids which must be maintained free of contamination by even such relatively harmless liquids as light transformer oil or other well-known dielectric liquids. The novel arrangement disclosed herein not only assures this condition, but also provides equally adequate protection against contamination of the dielectric liquid in the motor compartment by the pump liquid. A unit such as that described may be maintained in continuous operation over a very extended period of time without the necessity of shut-down for repairs or adjustments, such as is required with pumps employing shaft stuffing boxes.

The connection of the conduits 28 and 39 to the pump suction and discharge conduits 2 and 4, respectively, constitutes a simple arrangement for establishing the desired pressures in the two balance chambers when the pump is of the single stage type, and avoids making special connections in the pump casing. However, it will be understood that any other equivalent arrangement may be employed. If the pump is of the multi-stage type, the conduits 28 and 39 may communicate with any two zones within the pump casing having the desired pressure differential.

I claim:

1. A motorpump comprising: a housing structure defining a motor compartment containing a body of dielectric liquid, a pump chamber, and a seal chamber intermediate the motor compartment and the pump chamber and containing a body of liquid; a motor in said motor compartment; a shaft extending from the motor compartment through the seal chamber and into the pump chamber and connected to a pumping element therein; semi-effective mechanical seals for said shaft normally isolating said seal chamber from said motor compartment and from said pump chamber; means for subjecting said seal chamber to the pressure of the pump liquid on the suction side of said pumping element; means for subjecting said motor compartment to the pressure of the pump liquid on the discharge side of said pumping element; and means for subjecting the pump chamber side of the shaft seal separating the pump chamber from the seal chamber to the pressure of the pump liquid on the discharge side of said pumping element.

2. A motorpump comprising: a housing structure defining a motor compartment containing a body of dielectric liquid, a pump chamber, and a seal chamber intermediate the motor compartment and pump chamber and containing a body of liquid; a motor in said motor compartment; a pumping element in said pump chamber; a shaft extending from said motor compartment through said seal chamber and into said pump chamber and operatively connecting said motor and pumping element; semi-effective mechanical seals for said shaft normally isolating said seal chamber from said motor compartment and from said pump chamber; means including a dielectric liquid reservoir containing a body of dielectric liquid and a pump liquid reservoir containing a body of pump liquid connected in series between said motor compartment and said pump chamber at the discharge side of said pumping element, means interposed between said bodies of dielectric liquid and pump liquid for isolating them from each other while establishing and maintaining pressure transfer relation therebetween; means including a seal chamber liquid reservoir containing a body of seal chamber liquid and a second pump liquid reservoir containing a body of pump liquid connected in series between said seal chamber and said pump chamber at the suction side of said pumping element, means interposed between said two last-named bodies of liquid for isolating them from each other while establishing and maintaining pressure transfer relation therebetween; the pump chamber side of the shaft seal between said seal chamber and said pump chamber being subjected to substantially the pressure of the pump liquid at the discharge side of said pumping element.

3. A motorpump comprising: a motor housing enclosing a motor and containing a body of dielectric liquid; a pump casing containing a pumping element and having walls defining a relatively low pressure zone and a relatively high pressure zone; walls defining a seal chamber interposed between said motor housing and said pump chamber and containing a body of liquid; shafting connected to said motor and extending from said motor housing through said seal chamber and into said pump casing and connected to said pumping element; semi-effective mechanical seals for said shafting for substantially isolating said seal chamber from the interiors of said motor housing and of said pump casing, the seal between said seal chamber and said pump casing being exposed on its pump casing side to pump liquid at substantially the pressure in said high pressure zone; means for subjecting the dielectric liquid in said motor housing to substantially the pressure of the pump liquid in said high pressure zone, said means comprising reservoir means containing bodies of dielectric liquid and pump liquid communicating respectively with said motor housing and the high pressure zone in said pump casing, and means interposed between said bodies of liquid for preventing intermixing thereof while maintaining said bodies of liquid in pressure transfer relation with each other; and means for subjecting the liquid in said sealing chamber to substantially the pressure of the pump liquid in said low pressure zone, said last-named means comprising other reservoir means containing bodies of seal chamber liquid and pump liquid communicating respectively with said seal chamber and the low pressure zone in said pump casing, and means interposed between said last-named bodies of liquid for preventing intermixing thereof while maintaining said bodies of liquid in pressure transfer relation with each other.

4. A motorpump as set forth in claim 3, wherein at least one of said reservoir means comprises walls defining a pair of compartments communicating with each other at their lower ends only and each containing in its upper portion one of said bodies of liquid, and wherein said means interposed between the bodies of liquid comprises a body of third liquid heavier than and immiscible with each of said liquids.

5. A motor pump as set forth in claim 1, wherein each of said shaft seals comprises relatively rotatable sealing elements one of which is axially fixed and the other being axially movable and resiliently urged into sealing engagement with the axially fixed element, the axially fixed element of each seal being disposed between its respective axially movable element and said seal chamber, whereby the relatively higher pressures in said motor compartment and pump chamber urge said axially movable sealing elements into sealing engagement with their respective axially fixed sealing elements.

CARL J. BLOM.

REFERENCES CITED

The following references are of record in the file of this patent:

UNITED STATES PATENTS

| Number | Name | Date |
|---|---|---|
| 2,266,039 | Hollander et al. | Dec. 16, 1941 |